3,584,993
ALKYLENE BIS-ALLYLTHIOUREAS STABILIZING DISPERSE DYES

William J. Myles, 105 E. New England Ave., Summit, N.J. 07901; Francis S. Moussalli, 3210 Northampton Drive, Charlotte, N.C. 28210; Albert Bloom, 770 N. Boylston St., Boston, Mass. 02130; and Paul L. Tobey, Sommer St., Rehoboth, Mass. 02769
No Drawing. Continuation of application Ser. No. 417,813, Dec. 11, 1964. This application June 12, 1969, Ser. No. 835,891
Int. Cl. D06p 5/02
U.S. Cl. 8—165
6 Claims

ABSTRACT OF THE DISCLOSURE

Any of alkylene di-allylthioureas, halo- or hydroxy-substituted N-aryl or N-alkyl allylthioureas, quaternary ammonium or N-heterocyclic derivatives of the allylthioureas are used to stabilize disperse dyes, protein fibers, nylon, spandex, polyurethane foam or rubber. These allylthioureas are also used as antioxidants for soaps and oils, corrosion inhibitors, anti-tarnish agents, hydrocarbon oil additives and electroplating bath additives.

---

This is a continuation of Ser. No. 417,813 filed Dec. 11, 1964 and now abondoned.

This invention relates to agents which prevent or inhibit the decomposition of compositions or articles which carry said agents.

One category of embodiments of this invention relates to preventing or inhibiting such decomposition by the action of components of or materials in the air, including contaminants. Still more specifically this invention relates to preventing or inhibiting discoloration accompanying decomposition caused by the action of chemical agents (e.g., oxygen, ozone, chlorine, oxides of nitrogen and sulfur and the like) alone, in mixtures and in combination with ultraviolet light. The term "colorant" as used in the specification and claims means any dye or pigment and the like which is used to impart color to a filament, film, shaped article, surface and the like; and the term "discoloration" means change of color of a composition or article due to decomposition or chemical change of colorant carried by the composition or article or due to decomposition or chemical change of the composition or article itself (i.e., due to decomposition of decomposable material).

Colorant-containing compositions undergo changes when exposed to light or chemicals or a combination of these two in an everyday phenomenon. The "fading" of colored fabrics from exposure: to sunlight; or to chemical agents, such as oxygen or compounds capable of liberating oxygen such as hydrogen peroxide, sodium perborate, chlorine or agents capable of liberating chlorine such as hypochlorites, chloroamines and chlorotriazines is too well established to require further exposition.

Thus, it is an object of this invention to provide compositions of matter comprising a mixture of a colorant and a decomposition inhibitor. The compositions of matter will be suitable for dyeing, pigmenting, coating, painting and the like.

Furthermore, since the decomposition inhibitors of the present invention need not necessarily be mixed with the colorant, it is a further object of this invention to provide articles and compositions such as polymeric filaments, films, paints and the like carrying a colorant and a decomposition inhibitor. The term "carrying" indicates that the colorant and decomposition inhibitor need not necessarily be mixed together, nor necessarily need either or both the intimately incorporated in the shaped article but may simply be present on the surface or in discreet portions of the article, for example.

It is a further object of this invention to provide decomposition inhibitors comprising nitrogen-substituted N-allylthiourea compounds.

It is a still further object of the present invention to provide decomposition inhibitors comprising a nitrogen-substituted N-allylthiourea compound selected from the group consisting of:

(a) 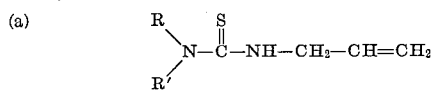

wherein R is an alkyl, aralkyl group or a hydroxy or chloro derivative thereof having up to 18 carbon atoms or an aryl group and R' is a hydrogen atom or an alkyl or aralkyl group or a hydroxy or chloro derivative thereof having up to 18 carbon atoms or an aryl group;

(b) 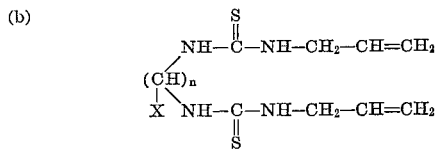

wherein $n$ is an integer from 1 to 8 and each X is a halogen atom, a hydrogen atom, a hydroxyl group, an alkyl group, a chloroalkyl group or a hydroxyalkyl group;

(c) 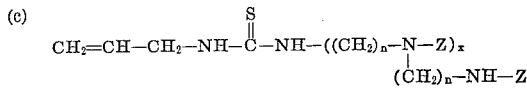

wherein $n$ is an integer from 1 to 8 and $x$ is an integer from 1 to 6 and Z is a hydrogen atom or an allyl thiocarbamido group;

(d) 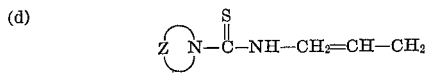

wherein Z ⊂ is the balance of a nitrogen, sulfur, phosphorus or oxygen atom-containing heterocyclic ring;

(e) 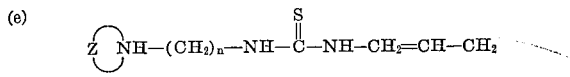

wherein $n$ is an integer from 1 to 4 and Z is the balance of a sulfur, phosphorus or oxygen atom-containing heterocyclic ring;

(f) 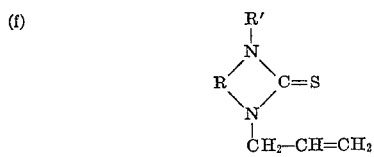

wherein R is a saturated or unsaturated carbon or heterocyclic ring and R' is an alkyl or aralkyl group having up to 18 carbon atoms or an aryl group.

Among the decomposition inhibitors of this invention, the following three have been found to be especially useful for the purpose of discoloration inhibition:

(1) N(allyl thioureido propyl) morpholine

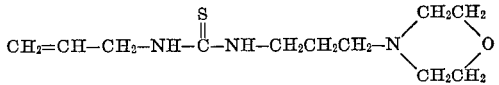

(2) 1,2-bis(allyl thioureido)ethane

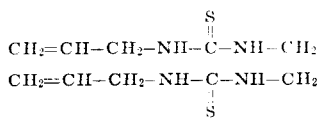

(3) N,N'-bis(allylthiocarbamyl)phenylhydrazine

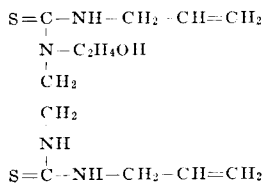

The decomposition inhibitors of the present invention can be prepared by the interaction of the appropriate isothiocyanate with the appropriate amine, and, in this connection, reference is made to the procedures given in Stoutland et al., "Reactions of Diamines with Isocyanates and Isothiocyanates." Journal of Organic Chemistry, vol. 24, June 1959, pp. 818 to 820.

The decomposition inhibitors of the present invention are particularly useful when used to protect the colorant in fabrics comprising cellulose triacetate, i.e., acetylated cellulose having an acetyl value, calculated as combined acetic acid, by weight, of at least 59%, the theoretical maximum being 62.5%. However, as pointed out above, the decomposition inhibitors of the present invention are useful in all contexts where it is desired to protect articles or compositions, whether or not carrying colorants, from discoloration. Thus, for example, polymeric materials or colorants which are carried on said materials often tend to discolor when exposed to the aforesaid conditions. Accordingly, the decomposition inhibitors of the present invention are particularly useful in protecting polymeric filaments, fibers, yarns, fabrics, films, other shaped articles and the like from discoloration. The identity and nature of the polymeric material is not critical. Cellulose triacetate is only one. Thus, for example, the polymeric material may be secondary cellulose acetate, i.e., cellulose acetate having an acetyl value of about 50 to 58% but preferably the well-known secondary cellulose acetate of commerce having an acetyl value of about 53 to 55%, other cellulose esters such as cellulose propionates, cellulose butyrate and cellulose ethers such as ethyl or benzyl cellulose, regenerated cellulose, e.g., viscose rayon or cuprammonium rayon, polyamides such as nylons, e.g., the polyamide or hexamethylene diamine and adipic acid or of 6- aminocaproic acid, polyurethanes, acrylonitrile polymers and copolymers, polyesters such as polyethylene terephthalate, cotton and animal fibers such as wool, mohair and silk.

As an example of one of the aforesaid causes of discoloration the inhibition of all of which is an object of the present invention, gas fading may be considered. Gas fading is the fading of dyed fabric by acidic gases in the atmosphere which are formed in combustion processes. Blue, violet and red aminoanthraquinone dyes are most vulnerable to gas fading. Certain azo acetate dyes are also particularly vulnerable to gas fading.

It is believed that oxides of nitrogen are primarily responsible for gas fading. Since cellulose acetate has a particularly pronounced tendency to absorb nitrogen dioxide, gas fading is a particular problem with cellulose acetate fabrics. In the specification and claims, the unqualified term "cellulose acetate" is used to denote secondary cellulose acetate and cellulose triacetate, generically.

Gas fading can be reduced by partial saponification of the fabric, or by covering the fibers with less permeable polymer coating, but both of these procedures are usually unacceptable from a practical point of view. A better method is to treat the fabric with some compound that acts as a gas fading inhibitor.

Noteworthy among inhibitors which have been used are two types, viz., the fugitive inhibitors, such as melamine, triethanolamine, and sodium formate and the permanent, substantive type, represented by N,N'-diphenylethylene diamine.

The known fugitive inhibitors give reasonable protection depending on the depth of shade and the sensitivity of the dye. However, their protection is reduced by perspiration and lost on washing. Some of these compounds, such as triethanolamine, reduce the light fastness of viscose rayon dyes, and their use presents problems with viscose rayon-acetate blends. The fugitive inhibitors act by maintaining an alkaline condition of the fabric, under which reactions of gas fading do not occur.

The known permanent, substantive type inhibitors can be applied during dyeing. These are weakly basic aromatic amines, which act by forming nitrosamines and ring-nitrosated compounds. These latter are generally rather yellow, and the use of these inhibitors is, accordingly, accompanied by a yellow discoloration. This is not too objectionable where the quantity of inhibitor is adjusted to the depth of the shade. However, inhibitors of the discoloring type are not useful in pastel shades, since inhibitor discoloration can be just as objectionable as gas fading color change. Furthermore, these inhibitors also affect the light fastness of certain acetate dyestuffs. Also, though these inhibitors are classified as permanent, this classification is merely relative and, in fact, these inhibitors tend to be washed from the fabric by repeated washings.

It is a further an object of this invention to improve the wash-fastness of the decomposition inhibitors of the present invention in filaments, yarns or fabrics by steam treating or by dry heat treating said filaments, yarns or fabrics carrying said decomposition inhibitors.

Other objects will be apparent from the following description and claims.

When colorant is used, it is particularly useful to incorporate the decomposition inhibitor in the colorant-containing composition and thus obviate a separate step of applying the discoloration inhibitor to the fabric. For such dual utility, disperse dye formulations are particularly suitable. Disperse dye formulations are often used for printing.

In the following examples and discussion, the invention will be described more particularly, especially with respect to printing cellulose triacetate with a disperse dye system since this is a preferred embodiment of the present invention.

EXAMPLE I

Three printing formulations, each containing a different one of the three decomposition inhibitors (1), (2), and (3) listed above, but in all other respects being alike, are prepared in the following manner: 30 g. of Eastman Blue GP (1-hydroxyethylamino, 4-methoxyethylamino anthraquinone) dyestuff is dispersed in warm water, and 30 g. of the decomposition inhibtor is dissolved in 80 g. of 2-phenoxyethanol. The resultant solution and dispersion are mixed together with 550 g. of a 3%, by weight, aqueous solution of sodium alginate. No noticeable change occurs in the shade of the printing pastes when the decomposition inhibitors are incorporated therein. After 28 days' storage, the pastes are stable and still found to give the same ultimate protection against gas fading. Samples of cellulose triacetate fabric are roller printed with each of the three printing formulations. The printed fabrics are dried, steamed for 60 minutes at 240° F. (10 p.s.i.g.), rinsed with cool water, washed with water at 140° F., the rinse and wash water containing 2 g./l. Ipegon T–51 (fatty methyl taurides), and dried. A control printed fabric is prepared by printing and after-treating a cellulose triacetate fabric sample in the same manner as the other samples. The printing formulation is prepared in the same manner, but, of course, without decomposition inhibitor and has the following composition:

| | G. |
|---|---|
| Eastman Blue GP | 30 |
| Water | 395 |
| Keltex S (3% by weight sodium alginate in water) | 495 |
| 2-phenoxyethanol | 80 |
| | 1000 |

The fabric samples are tested for gas-fading resistance by use of the AATCC (American Association of Textile Chemists and Colorists) standard test 63–1962, using the apparatus shown in FIG. 3 at page B–74 of the 1963 Technical Manual and Year Book of the American Association of Textile Chemists and Colorists. The sample fabrics which were printed with the decomposition inhibitor-containing compositions showed no or inconsequentially minor gas fading after being subjected to two units of gas fading, even when the sample fabrics were washed from 5 to 10 times prior to gas-fading testing. On the other hand, the control printed fabric was severely faded even after only one unit of gas fading.

Furthermore, it is found that fabrics printed with print compositions containing the decomposition inhibitors of the present invention exhibit improved fastness to chlorine bleaching, improved fastness when exposed to ozone, improved resistance to sunlight-induced degradation; furthermore, it is found that the inhibitors not only are wash-fast but are also dry cleaning-fast.

In the same manner, there are prepared 1000 g. samples of printing formulation each containing 30 g. of one of N-allyl-N'-hydroxyethyl thiourea, N-allyl-N'-benzyl thiourea, N-allyl-N'-phenyl thiourea, N-allyl-N'-octadecyl thiourea, N-allyl-N'-dodecyl thiourea, and piperazine-1,4-bis-(N-allyl thiourea) and a fabric sample is printed with each. The printed fabrics exhibit gas fading resistance which does not decrease substantially upon washing. Similarly tested are N-allyl-N'-chloroethyl thiourea; N,N-allyl-N',N'-diethyl thiourea; N-allyl-4-morpholinethiocarboxamide; N-allyl-1-piperidylthiocarboxamide and 1-allyl-2-benzimidazole thione; all the printed sample fabrics thus prepared exhibit gas fading resistance which does not decrease substantially upon washing.

Also it is observed that the decomposition inhibitors of the present invention increase the color yield and the general quality of prints; furthermore, it is observed that during steam fixation of the dyestuff, a lower than conventional steam pressure may be used.

The initial dispersant for the dyestuff may be any suitable liquid in which the dyestuff may be dispersed but preferably is water. The concentration by weight of the dyestuff in its initial dispersant may be from about 5 to 50% and preferably is from about 10 to 30%.

The initial solvent for the decomposition inhibitor may be any suitable liquid in which the decomposition inhibitor may be dissolved. 2-phenoxyethanol has been found to be a particularly suitable solvent for this purpose. The concentration by weight of the decomposition inhibitor in its initial solvent may be from about 10 to 40% and preferably is about 25 to 35%; said initial solvent may comprise from about 2 to 25% by weight of the entire printing formulation.

The term "initial" with respect to the dyestuff dispersant and decomposition inhibitor solvent is used to distinguish this dispersant and solvent from the formulation as a whole containing both dyestuff and inhibitor.

Water insoluble aromatic or aliphatic glycol ethers, e.g., phenyl glycol ethers, and lower aliphatic esters thereof and the like have been found to be solvents for the gas-fading inhibitors of the present invention at temperatures from about 40–70° C. It is desirable that such solvents be present in the ultimate colorant-containing composition since they are also swelling agents for cellulose acetate and thus aid the penetration of the colorant (e.g., dyestuff) into the fibers of the fabric.

The weight ratio of dyestuff to decomposition inhibitor in the printing formulation and in the printed fabric may be from about 5:1 to 1:5 and preferably is from about 1:1 to 1:3.

The inclusion in the formulation of a highly effective swelling agent for the fabric composition in order to improve the take-up of colorant and decomposition inhibitor can be useful. For secondary cellulose acetate and cellulose triacetate, benzoic acid, tributyl phosphate, butyl carbitol, phenyl glycol ethers and lower aliphatic esters thereof are among the particularly useful swelling agents. The particular swelling agent used is not critical and any of the large number of known swelling agents for cellulose acetate may be used. However, swelling agents, such as phenyl glycol ethers, which are also solvents for the decomposition inhibitors are preferred since thereby the necessity for additional solvents for the decomposition inhibitors, such as ethanol, is avoided.

The disperse dyestuff may be any of those commonly used for example Eastman Blue GP (1-hydroxyethylamino, 4-methoxyethylamino (anthraquinone)), Lenra Blue RLS (1,5-dihydroxy, 4-analino, 8-nitro (anthraquinone)), Eastone Fast Red GLF (C.I. Disperse Red 35), Amacel Yellow CW (C.I. Disperse Yellow 37), Interchemical Acetate Green Blue ALF 40 (C.I. Disperse Blue 7), Celliton Blue BB (C.I. Disperse Blue 1), Celliton Fast Pink FF 3 BA-CF (C.I. Disperse Red 11), and the like. The disperse dyestuff may comprise from about 0.01 to 10% by weight of the total weight of the formulation and preferably from about 0.1 to 3%. The particular disperse dyestuff used is not critical and any of the large number of known disperse dyestuffs for cellulose acetate may be used.

The thickening agent may be any of those commonly used in printing and may include aqueous solutions, dispersions, suspensions or pastes of starch, converted starch, dextrin, British gum, textile gum, gum tragacanth, locust bean gum, gum arabic, alginates, methyl cellulose ether, sodium carboxymethyl cellulose and the like. The concentration of the thickener in its aqueous carrying medium may be from about 3 to 10%, depending in part upon the particular thickener selected. The thickener in its aqueous carrying medium, for the purpose of convenience, is herein referred to as "thickening agent." The thickening agent may comprise from about 30 to 60% by weight of the total weight of the formulation and preferably from about 40 to 50%.

While the invention has been described in particular detail with respect to printing with disperse dyestuff formulations, it is to be understood that the decomposition inhibitors may be used in any of the other known coloring processes such as solution dyeing, dope, dyeing, pigmented emulsion printing and the like. Furthermore, the application of the gas fading inhibitors to the fabric may be effected prior to, at the same time as or subsequent to the coloration of the fabric.

After drying the fabric to which the inhibitor has been applied, it has been found particularly advantageous to treat the fabric with steam or dry heat. It has been found that such treatment makes the inhibitor especially wash-fast. Exposure of the fabric to steam at about 212° F. to about 250° F. for a length of time of about 75 minutes to about 3 minutes, preferably for about 60 to 5 minutes at about 220 to about 240° F., has been found to be quite effective in improving wash fastness; the temperature and time are, of course, inversely related. Similar improvement results when the exposure is to dry heat for about 5 seconds to about 5 minutes or more at a temperature of from about 450° F. to about 300° F. and preferably for about 12 to about 20 seconds at about 400° F. to about 360° F.; the temperature and time are, of course, inversely related.

It should be understood that the detailed numerical limitations set forth above are necessarily applicable only to a printing process as described in Example I and that the proportions of inhibitor and colorant and the other operating conditions will vary from coloring process to coloring process and are readily determinable by routine experimentation.

It should be noted that, whether or not colorant is used, the decomposition inhibitor may be applied to the material which it is to protect in a separate step, e.g. padding onto a fabric, and the above indicated ranges for the steam or dry heat treatment will be applicable for improving the wash fastness of the inhibitor.

As pointed out above, the present invention is useful wherever it is desired to prevent discoloration. Thus, for example, the decomposition inhibitors of the present invention prove effective against the chlorine degradation of fiber-reactive and sulphur dyes printed on cotton; similar protection is also achieved against nitrogent oxide degradation and ozone degradation. As a further example of the utility of the present invention, decomposition inhibitor may be incorporated with colorant in a viscose solution from which a film is cast. Also, discoloration problems not related to the presence of colorant are solved by the use of the inhibitors of the present invention. Thus for example, polyurethane textile finishes tend to yellow due to gas fading and chlorinated pool water and thereby discolor the textiles on which they are carried; and when the discoloration inhibitors of the present invention are incorporated in these textile finishes it is found that such tendency to yellow is prevented. As a further example, cotton fabrics which have been washed in the presence of chlorine bleaches tend to become degraded, weakened and discolored during subsequent ironing, which tendency may be prevented by providing the discoloration inhibitors of the present invention in the fabric. As a still further example, cotton fabrics are treated with sulfones and then cured in the presence of alkaline catalysts; a yellowing discoloration often occurs during the curing process; such discoloration may be prevented by providing the discoloration inhibitors of the present invention in the fabric.

In addition to the compounds named above, the following compounds are further specific examples of decomposition inhibitors within the scope of this invention.

They are prepared by dissolving the indicated amine in either xylene or terbutyl alcohol (or mixtures of these) and adding allyl isothiocyanate in the indicated mole ratio. Where the reaction product is a solid, it is removed by filtration, washed with xylene and dried. Those reaction products which are oils are obtained by evaporating the solvent from the reaction mixture. The following table indicates the amine used, the mole ratio of allyl isothiocyanate to amine and the nitrogen-substituted N-allyl thiourea compounds which result and their melting points. (It may be noted that where the nitrogen-substituted N-allyl thiourea is to protect a substrate or a component thereof from decomposition, it may be made by reacting the appropriate amine and appropriate isothiocyanate right on the substrate; e.g., a yarn may be dipped in a solution of the amine and thereafter in a solution of the isothiocyanate whereby the reaction takes place on the yarn or the order of application of the reactants may be reversed with the same result.)

| Amine used | Mole ratio of allyl iso-thiocyanate to amine | Resultant compound | M.P. (° C.) |
| --- | --- | --- | --- |
| 1. N-aminopropyl morpholine | 1 | N-(allylthioureidopropyl) morpholine | 67 |
| 2. Aminoethylethanolamine | 2 | N-(allylthioureidoethyl), N-β-hydroxyethyl, N'-allyl thiourea. | 92 |
| 3. Phenylhydrazine | 2 | N,N'bis(allylthiocarbamyl)phenylhydrazine | 120 |
| 4. Do | 1 | N-allylthiocarbamyl phenylhydrazine | 56 |
| 5. o-Phenylene diamine | 2 | N,N'-bis(allylthiocarbamyl)-o-phenylenediamine. | 120 |
| 6. p-Phenylene diamine | 2 | N,N'-bis(allylthiocarbamyl)-p-phenylenediamine. | 205 |
| 7. N,N'bis-(1-methylheptyl)ethylene diamine. | 2 | N,N'-bis (1-methylheptyl), N,N'-bis(allylthiocarbamyl) ethylene diamine. | Oil |
| 8. Menthane diamine | 2 | N,N'-bis (allylthiocarbamyl) menthane-1,8-diamine. | Oil |
| 9. 2,4-toluylene diamine | 2 | N,N'-bis (allylthiocarbamyl)-2,4-toluylene diamine. | 107 |
| 10. N-(p-aminophenyl) morpholine | 1 | N-(p-allylthioureidophenyl) morpholine | 178 |
| 11. N-β hydroxyethyl, N-ethyl-p-phenylene diamine. | 1 | p-allylthioureido, N-ethyl, N-β-hydroxyethyl aniline. | 124 |
| 12. 2-aminopyridine | 1 | 2-(allylthioureido) pyridine | 105 |
| 13. 1-4 cyclohexane bis methylamine | 2 | 1-4 bis (allylthioureidomethyl) cyclohexane | Oil |
| 14. N-hydroxyethyl cyclohexylamine | 1 | N-β hydroxyethyl, N-(allylthiocarbamyl) cyclohexylamine. | 90 |
| 15. N-ethyl cyclohexylamine | 1 | N-ethyl, N-(allylthiocarbamyl)cyclohexylamine. | 88 |
| 16. Diethylene triamine | 3 | N,N,bis-(allylthioureidoethyl), N'-allylthiourea. | 102 |
| 17. 2-amino, 2-ethyl propandiol 1,3 | 1 | 2-ethyl,2(allylthiouredio) propandiol 1,3 | Oil |
| 18. Triethylene tetramine | 4 | N¹,N²,N³,N⁴ tetra (allylthiocarbamyl) triethylenetetramine. | 125 |
| 19. Tetraethylene pentamine | 5 | N¹, N², N³, N⁴, N⁵ penta(allylthiocarbamyl) tetraethylene pentamine. | 187 |
| 20. M-methyl tetrahydrofurfuryl amine. | 1 | N-methyl,N-(allylthiocarbamyl)tetrahydrofurfuryl amine. | Oil |
| 21. 1,3-diaminopropane | 2 | 1,3 bis-(allylthioureido) propane | 142 |
| 22. p,p' Methylenedianiline | 2 | Bis-(p-allylthioureidophenyl) methane | 160 |
| 23. 8-amino-2-naphthol | 1 | 8-allylthioureido-2-naphthol | 140 |
| 24. Diethylene tramine | 2 | N¹,N³, bis (allylthiocarbamyl) diethylene triamine. | Oil |
| 25. Do | 1 | N-(allylthiocarbamyl) diethylenetriamine | Oil |
| 26. Triethylene tetramine | 2 | N¹,N⁴, bis-(allylthiocarbamyl) triethylene tetramine. | Oil |
| 27. Do | 3 | N¹,N²,N⁴ tri-(allylthiocarbamyl)triethylene tetramine. | Oil |

The decomposition inhibitors of the present invention have many uses in addition to those indicated above. They may, for example, be used as antioxidants (e.g., in soaps, lubricating oils, fuel oils, and vegetable oils), corrosion inhibitors (e.g., for corrosion inhibition of silver, copper, nickel, and tool steels), anti-tarnish agents, hydrocarbon oil (e.g., lubricating and fuel oil) stabilizers, electroplating bath additives, inhibitors of yellowing of protein fibers (such as wool and silk), inhibitors of nylon yellowing, inhibitors of spandex yellowing, inhibitors of polyurethane foam yellowing, inhibitors of polyurethane coating yellowing, polymer stabilizers, and rubber antiozonants.

The following set of examples illustrates, under appropriate headings, some of these additional uses. The headings, such as "Inhibitors of the Yellowing of Fibers" and "Corrosion Inhibitors," indicate the particular use of the decomposition inhibitors of the present invention being illustrated.

EXAMPLE II

Inhibitors of the yellowing of fibers (A) Protein: Samples of white silk cloth and white wool cloth are soaked in a 0.5% volume of N-allyl, N'-β- hydroxyethyl thiourea for 1 hour, rinsed with water and dried at room temperature. Additional samples are soaked in water for 1 hour, rinsed and dried in the same manner.

All samples are mounted on a board and exposed to room conditions for 60 days. At that time the samples which were not treated with the thiourea are much yellower than the treated samples.

(B) Polyamide: Samples of white nylon-6,6 cloth, treated in the same manner as "A" above, give the same results as the silk and wool.

(C) Polyurethane: Samples of white spandex cloth are treated as in example "A" with similar results.

Additional experiments with fabrics as in "A," "B" and "C" using other nitrogen-substituted N-allyl thioureas such as 1-2 bis (allylthioureido) ethane and N-allyl, N'-hexyl thiourea give comparable results.

CORROSION INHIBITORS

Low carbon steel turnings are degreased by washing with carbon tetrachloride followed by rinsing with acetone. The turnings are then dried in an oven at 60° C. 10 g. of the turnings are moistened with 5 cc. of a 0.1% solution of N-allyl N'β-hydroxyethyl thiourea and allowed to stand at room temperature for 24 hours.

Another 10 g. sample of the turnings is moistened with 5 cc. of water and allowed to stand at the above temperature for the above time.

Inspection of the turnings shows that the sample treated with the nitrogen-substituted N-allyl thiourea has only minor amounts of rust while the untreated sample is mostly covered with rust.

N-allylthioureidopropyl morpholine and 1,2-bis (allylthioureido) ethane are tested in the same manner and are also found to inhibit corrosion of the steel turnings.

Anti-tarnish agents

Two strips of silver are each cleaned by washing with hot soap and water, polished with jewelers rouge, rewashed with soap and water and dried. One is immersed in a 2% solution of N-allyl N'-β-hydroxyethyl thiourea for 10 minutes. It is then rinsed with water and dried.

Both strips are then immersed in a 0.1% solution of ammonium sulfide for 5 minutes. The strip that was treated with the nitrogen-substituted N-allyl thiourea shows only a trace of darkening while the untreated strip is heavily tarnished.

Similar results are obtained when 1-3 bis (allylthioureido) propane or N-allyl, N'N' diethyl thiourea are used in an aqueous-alcohol mixture.

Polyurethane foam discoloration inhibitors

A urethane foam is prepared by mixing 100 g. of polyether triol (M.W. 3200), 1.0 g. water soluble silicone (1–520), 0.13 g. DABCO, 0.30 g. stannous octoate and 3.5 cc. water. To this mixture is added 44.5 g. toluene diisocyanate, the mixture blended with a high speed agitator for 15 seconds and poured into an aluminum foil mold. A similar foam, except that 1.5 g. of 1-2 bis(allylthioureido) ethane is dissolved in the triol, is also prepared. Both samples of foam are essentially white when prepared. However, when they are both exposed to room conditions for 30 days, the sample containing the nitrogen-substituted N-allyl thiourea becomes only slightly yellow while the untreated foam becomes brownish yellow.

Antioxidants

A sodium stearate soap bar containing .10% N-allyl, N'phenyl thiourea is prepared by adding the required amount of the nitrogen-substituted N-allyl thiourea to powdered sodium stearate and mixing in a ball mill for 2 hours. The mixture is then compressed into a cake using a tablet press. A similar bar, containing no N-allyl, N'phenyl thiourea, is prepared in the same manner. Both bars are allowed to stand at room temperature, exposed to daylight for 60 days. The bar containing no N-allyl, N'-phenylthiourea becomes yellow while the treated bar is very pale cream colored. When N-allyl N'-β-hydroxyethyl thiourea is substituted for the phenyl compound similar results were obtained.

The embodiments of the invention in which an exclusive property or privilege is claimed are defined as follows:

1. A dispersed dyestuff formulation for printing fabric comprised of at least one disperse dyestuff and a decomposition inhibitor of the formula

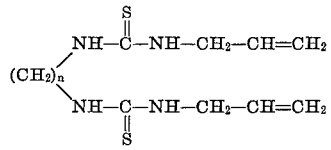

wherein:
(a) n is from 1 to about 8;
(b) the weight ratio of disperse dyestuff to decomposition inhibitor is from about 5/1 to about 1/5; and
(c) said formulation contains solvent for said inhibitor, wherein:
(1) said solvent comprises from about 2 to about 25 percent (by weight of said formulation) of said formulation, and
(2) said decomposition inhibitor comprises from about 10 to about 40 percent of the weight of solvent.

2. The formulation of claim 1, wherein $n$ is 2.

3. The formulation of claim 2, wherein said disperse dyestuff formulation is comprised of from about 25 to about 35 percent (by weight of solvent) of said decomposition inhibitor.

4. The formulation of claim 3, wherein:
(a) said disperse dyestuff formulation contains a thickening agent, said thickening agent comprising from about 30 to about 60 percent of the total weight of said formulation; and
(b) the weight ratio of said disperse dyestuff to said decomposition inhibitor in said formulation is from about 1/1 to about 1/3.

5. The formulation of claim 4, wherein:
(a) said thickening agent is sodium alginate, and
(b) said solvent is selected from the group consisting of phenyl glycol ethers and the lower aliphatic esters thereof.

6. The formulation of claim 5, wherein said formulation is comprised of a 3 percent aqueous solution of said sodium alginate thickener.

References Cited

UNITED STATES PATENTS

| | | | |
|---|---|---|---|
| 1,723,230 | 8/1929 | Ellis | 8—165 |
| 2,347,508 | 4/1944 | Rugeley et al. | 8—173 |
| 2,416,387 | 2/1947 | Haddock et al. | 8—37X |
| 2,583,370 | 1/1952 | Goppel et al. | 260—769 |
| 3,021,188 | 2/1962 | Conceatori | 8—165 |
| 3,024,218 | 3/1962 | Stevens | 260—45.9 |
| 3,069,220 | 12/1962 | Dawson | 8—180 |
| 2,524,811 | 10/1950 | Koberlein | 8—166 |
| 2,982,597 | 5/1961 | Salvin et al. | 8—165 |

OTHER REFERENCES

Salvin: American Dyestuff Reporter, 1952, pages 297–303.

Stoutland: J. of Organic Chemistry, vol. 24, June 1959, pp. 818 to 820.

DONALD LEVY, Primary Examiner

U.S. Cl. X.R.

21—2.5, 2.7; 99—163; 117—138.5; 204—45; 252—8.6, 475, 391, 402; 260—45.9